United States Patent [19]

Rangachar et al.

[11] 4,400,233

[45] Aug. 23, 1983

[54] SYSTEM AND METHOD FOR CONTROLLING AN ETCH LINE

[75] Inventors: Hemmige V. Rangachar, Newtown; Kenneth D. Powell, Lancaster, both of Pa.

[73] Assignee: RCA Corporation, New York, N.Y.

[21] Appl. No.: 441,229

[22] Filed: Nov. 12, 1982

[51] Int. Cl.[3] .......... C23F 1/02; B44C 1/22; C03C 15/00; C03C 25/06

[52] U.S. Cl. .......... 156/626; 156/644; 156/345; 356/429

[58] Field of Search .......... 156/626, 627, 644, 659.1, 156/651, 656, 345; 356/429, 430, 434; 250/559, 571, 572

[56] References Cited

U.S. PATENT DOCUMENTS

| | | | |
|---|---|---|---|
| 3,918,815 | 11/1975 | Gadbois | 356/157 |
| 3,955,095 | 5/1976 | Gadbois | 250/550 |
| 4,013,498 | 3/1977 | Frantzen | 156/345 |
| 4,124,437 | 11/1978 | Bond et al. | 156/640 |
| 4,126,510 | 11/1978 | Moscony et al. | 156/626 |
| 4,289,406 | 9/1981 | Maddox | 356/429 |

*Primary Examiner*—William A. Powell
*Attorney, Agent, or Firm*—Eugene M. Whitacre; Dennis H. Irlbeck; Lester L. Hallacher

[57] ABSTRACT

An etch line for etching apertures in a sheet of material is controlled by measuring the energy transmission capabilities of the apertures immediately after initially rinsing the sheet. A second energy transmission capability measurement is made after the sheet is fully dried. The results of the two measurements are combined to produce a predicted transmission signal which is used to control a parameter of the etching process.

10 Claims, 1 Drawing Figure

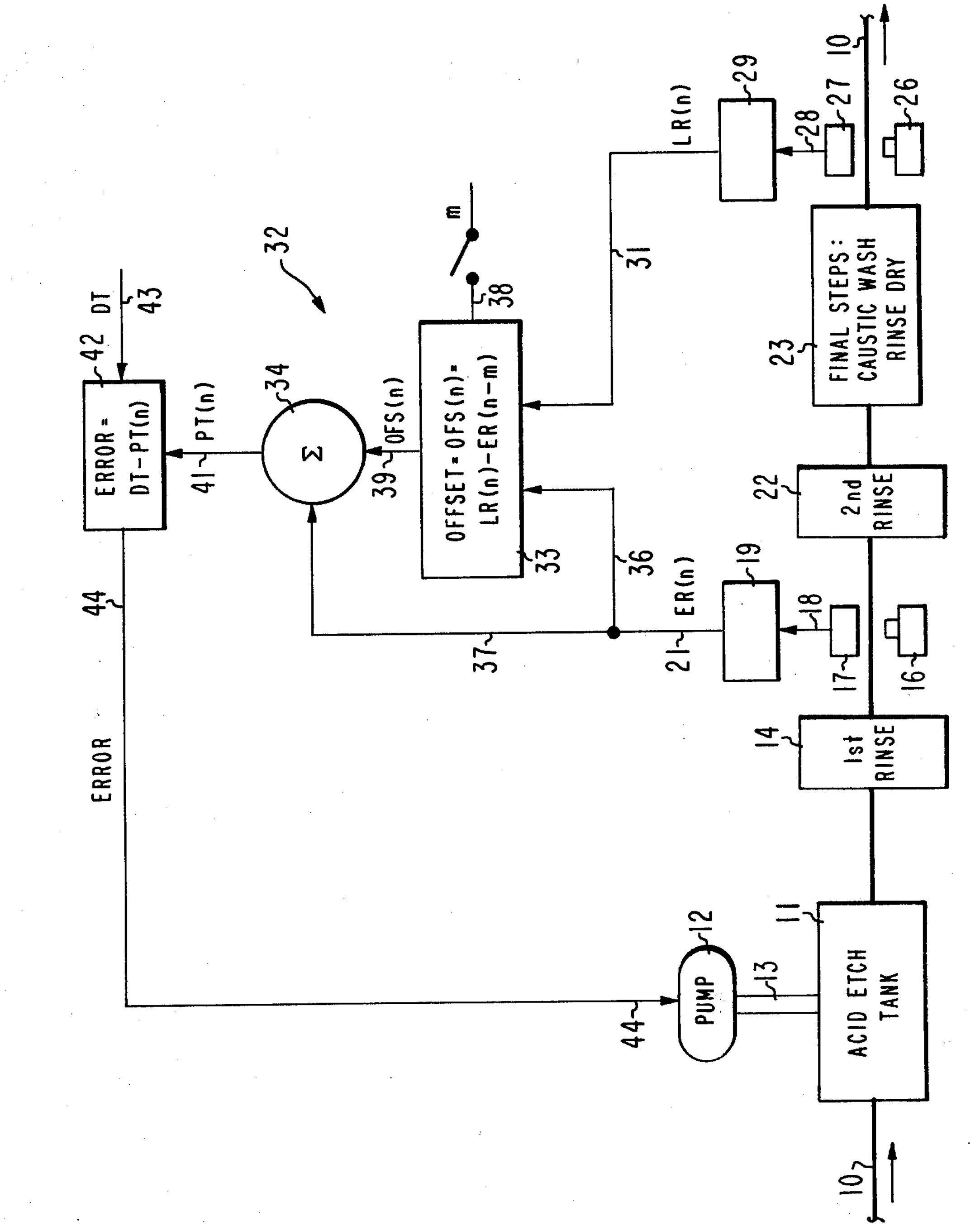
ERROR= DT-PT(n)
42
DT
43
32
PT(n)
41
34
Σ
OFS(n)
39
OFFSET=OFS(n)= LR(n)-ER(n-m)
33
38
m
31
36
37
44
ERROR
PUMP
12
13
44
ACID ETCH TANK
11
10
1st RINSE
14
ER(n)
21
19
18
17
16
2nd RINSE
22
FINAL STEPS: CAUSTIC WASH RINSE DRY
23
LR(n)
29
28
27
26
10

SYSTEM AND METHOD FOR CONTROLLING AN ETCH LINE

BACKGROUND OF THE INVENTION

This invention relates generally to the control of an etch line and particularly to such control utilizing the multi-measurement of the energy transmission capability of apertures etched in a sheet of material.

In the manufacture of shadow masks for color television kinescopes, a roll of flat material is coated with a photoresist material and is subsequently photo exposed to form a series of aperture patterns and the peripheries of the shadow masks on the photoresist material. The unexposed photoresist material is then washed away leaving the bare material. The bare material is then subjected to an acid etching process in which the bare material is removed to form the apertures and partially etched peripheries used to remove the shadow masks from the strip of material. After the etching is completed, the transmission of actinic energy, typically light, through the apertures is measured to verify that the shadow masks are suitable for the intended use. The result of the measurement typically is used to control one, or more, of the etching process parameters to optimize the energy transmission capability of the etched apertures. It is undesirable to make the energy transmission measurement immediately following the etching of the apertures because the material is still wet with the etching or rinsing solutions which inhibit the transmission of energy and render the measurement inaccurate. It is equally undesirable to measure the light transmission capabilities after the etched shadow masks are completely rinsed and dried because improper etching is detected at a later time and a large number of masks are improperly etched before the measurement is made.

The instant invention overcomes these disadvantages by the provision of a control system which utilizes an early energy transmission measurement immediately after the first rinse cycle and a second energy transmission measurement after the apertures are fully dried. The results of the two measurements are combined into a predicted transmission signal which is used to control at least one of the etch line control parameters.

SUMMARY OF THE INVENTION

A method of etching a pattern of apertures in an etchable sheet of material includes the steps of passing the sheet through an etching process and measuring the energy transmission capability of the etched apertures to obtain an early energy transmission signal. The sheet is then dried and the energy transmission capability of the etched apertures is again measured to obtain a later energy transmission signal. The early and late energy transmission signals are utilized to obtain an error signal which is used to control a parameter of the etching process.

BRIEF DESCRIPTION OF THE DRAWINGS

The FIGURE is a block diagram of a preferred embodiment.

DETAILED DESCRIPTION OF THE PREFERRED EMBODIMENT

In the FIGURE, a continuous strip 10 of material which has previously been provided with a shadow mask periphery configuration and aperture pattern is passed into an acid etch tank 11. A pump 12 injects acid into the tank 11 by way of plumbing 13. The acid is provided to the tank 11 under controlled conditions of pressure, temperature, and concentration in accordance with the particular shadow masks to be etched. As the sheet of material 10 passes through the etch tank 11, the portions of the material which are not protected by the light exposed photoresist material are etched through, leaving the desired aperture periphery patterns on the material. After the strip 10 exits from the etch tank 11, the strip passes into a first rinse cycle 14 where the rinsing away of the acid residue begins. As the strip 10 exits from the first rinse tank 14, a source 16, of actinic energy, such as light, passes energy through the apertures to a detector 17, such as a densitometer. The output signal on the output line 18 of the densitometer 17 thus is an electrical signal which is representative of the actinic energy transmission capability of the apertures etched into the sheet of material 10. The signal available on line 18 is provided to a energy measurement circuit 19 which provides an early actinic energy transmission signal ER(n) on the output line 21. The (n) designation is used to indicate that the signal ER(n) is an instantaneous signal and thus continuously changes. This is also true of the other signals having the (n) designation. The energy transmission circuit 19 can be of the type described in U.S. Pat. No. 4,289,406 which is incorporated by reference herein. The energy from the source 16 passes through the apertures in the sheet of material 10 prior to the final washing, rinsing and drying of the material and, accordingly, residue photoresist and liquid on the material affects the energy transmission capability of the apertures and the early energy transmission signal ER(n) is not sufficiently accurate to be used to control the etching process without modification.

The material continues along the processing line and enters a second rinse tank 22 prior to the final processing stage 23 where such steps as a caustic wash to remove acid and photoresist residue, rinsing away the caustic wash and the final drying of the material are completed. All these steps are represented collectively by way of the block 23 in the FIGURE. After the final drying stage, the sheet material 10 passes between a second, or late, energy source 26 which passes energy through the apertures to a second energy detector 27. The output of the detector 27 is provided by an output line 28 to an energy transmission measurement circuit 29. The circuit 29 and the energy source 26 can be identical to the energy transmission measurement circuit 19 and the energy source 16 respectively. The output signal of the measurement circuit 29 available on an output line 31, is a late energy transmission signal LR(n). Because the late transmission signal LR(n) was made after the final drying stage, the signal is much more precise than the early transmission signal ER(n). However, because the measurement was taken a substantial distance from the acid etch tank 11 the need for the correction of an etching process parameter is not known until a large number of shadow masks has been inproperly etched. Accordingly, the early transmission signal ER(n) alone is inadequate to properly control the etching parameters because of the residue on the masks and the late transmission signal LR(n) alone is inefficient in controlling the etching parameter because the lengthy time delay necessary to generate the signal results in a large number of unacceptable shadow masks being etched.

The inability of the transmission signals ER(n) and LR(n) to individually control the etching parameters is overcome by the provision of a circuit means 32 for receiving the transmission signals ER(n) and LR(n) and providing a predicted transmission signal PT(n). The early transmission signal ER(n) on the output line 21 is connected to an offset calculation circuit 33 and a summer 34 by lines 36 and 37 respectively. The offset calculation circuit 33 also receives the late transmission signal LR(n) available on the line 31. The offset circuit 33 also receives an input m by way of an input line 38. The signal m is representative of the number of shadow masks which travel between the detectors 17 and 27 in the time between the generation of the signals ER(n) and LR(n) and, thus, is indicative of the distance between the detectors. Accordingly, this signal must be changed when the type of shadow masks being etched is changed. The provision of the signal, therefore, is within the purview of one skilled in the art. The offset calculation circuit 33 algebraically combines the signals ER(n), LR(n) and m to produce an offset signal OFS(n) in accordance with the expression $OFS(n)=LR(n)-ER(n-M)$. The offset signal OFS(n) is available on output line 39 as an input to the summer 34. The offset signal OFS(n) and the early transmission signal ER(n) are thus combined by the summer 34 to provide a predicted transmission signal PT(n) on the output line 41. This signal is provided to an error calculating circuit 42 which also receives a desired transmission signal DT by way of an input line 43. The error calculation circuit 42 thus algebraically adds the two input signals to calculate the difference between the predicted transmission signal PT(n) and the desired transmission signal DT and provide an error signal in accordance with $DT-PT(n)$ on the output line 44. The signal DT available on the input line 43 and the signal m available on the input line 48 are system control parameters which are manually or automatically provided to the system depending upon the nature of the shadow masks to be etched. Accordingly, the provision of these signals is within the purview of one skilled in the art. The error signal is illustrated as being provided by the line 44 as an input to pump 12. However, the error signal can be used to change any parameter of the etching process such as the acid pressure, temperature or the speed at which the strip 10 is pulled through the etch tank. The changing of etching parameters in prior art etching control systems is described in U.S. Pat. No. 4,126,510 the teachings of which are incorporated by reference herein.

What is claimed is:

1. A method of etching a pattern of apertures in an etchable sheet of material comprising the steps of:

passing said sheet through an etching process and measuring the actinic energy transmission capability of the etched apertures to obtain an early energy transmission signal;

passing said sheet through at least one additional processing step including drying said material, and measuring the actinic energy transmission capability of the etched apertures to obtain a late energy transmission signal;

utilizing said early and late transmission signals to obtain an error signal; and using said error signal to control a parameter of said etching process.

2. The method of claim 1 wherein said early and late transmission signals are instantaneous values.

3. The method of claim 1 wherein said early and late transmission signals are combined to obtain a predicted transmission signal, and wherein said error signal is obtained by algebraically adding said predicted transmission signal and a desired transmission signal.

4. The method of claim 3 wherein said early and late transmission signals are subtracted to obtain an offset value, and wherein said predicted transmission signal is obtained by adding said offset value and said early transmission signal.

5. The method of claim 4 further including the step of including a factor indicative of the distance said strip travels between said early and late transmission measurements when obtaining said offset value.

6. A system for controlling the etching of apertures in a sheet of material by varying an etching parameter in accordance with the energy transmission capabiliity of said apertures comprising:

means for measuring the energy transmission capability of said apertures immediately after said etching and providing an early transmission signal;

means for measuring the energy transmission capability of said apertures after said sheet of material passes through a drying cycle and providing a late transmission signal;

means for receiving said early transmission signal and said late transmission signal and providing a predicted transmission signal; and means responsive to said predicted transmission signal for varying said etching parameter.

7. The system of claim 6 wherein said means responsive to said predicted transmission signal includes means responsive to said predicted transmission signal and to a desired transmission signal for providing an error signal in accordance with the difference between said signals.

8. The system of claim 7 wherein said means for receiving includes means for providing an offset signal in response to said early transmission signal and said late transmission signal, and means responsive to said offset signal and said early transmission signal for providing said predicted transmission signal.

9. The system of claim 8 wherein said means for providing an offset signal is responsive to a signal indicative of the spacing between said means for measuring the energy transmission.

10. The system of claim 9 wherein said energy is light.

* * * * *